(12) United States Patent
Zhang et al.

(10) Patent No.: US 11,300,736 B2
(45) Date of Patent: Apr. 12, 2022

(54) CONNECTOR ASSEMBLY

(71) Applicant: Tyco Electronics (Shanghai) Co. Ltd., Shanghai (CN)

(72) Inventors: Haibo Zhang, Shanghai (CN); Zhigang Song, Shanghai (CN); Qingquan Wan, Shanghai (CN); Songhua Liu, Dongguan (CN); Ji Luo, Dongguan (CN)

(73) Assignee: Tyco Electronics (Shanghai) Co. Ltd., Shanghai (CN)

( * ) Notice: Subject to any disclaimer, the term of this patent is extended or adjusted under 35 U.S.C. 154(b) by 0 days.

(21) Appl. No.: 16/902,646

(22) Filed: Jun. 16, 2020

(65) Prior Publication Data
US 2020/0393628 A1 Dec. 17, 2020

(30) Foreign Application Priority Data
Jun. 17, 2019 (CN) .......................... 201910522567.8

(51) Int. Cl.
*G02B 6/38* (2006.01)
(52) U.S. Cl.
CPC ......... *G02B 6/3887* (2013.01); *G02B 6/3893* (2013.01)
(58) Field of Classification Search
CPC ............................ G02B 6/3887; G02B 6/3893
USPC ........................................................ 385/85
See application file for complete search history.

(56) References Cited

U.S. PATENT DOCUMENTS

| | | | | |
|---|---|---|---|---|
| 5,323,480 A * | 6/1994 | Mullaney | ............ | G02B 6/4442 385/135 |
| 5,446,823 A * | 8/1995 | Bingham | ............ | G02B 6/4422 174/93 |
| 5,455,391 A * | 10/1995 | Demesmaeker | .... | B25B 23/0064 174/93 |
| 5,915,056 A * | 6/1999 | Bradley | ............ | G02B 6/38875 385/76 |
| 6,409,392 B1 * | 6/2002 | Lampert | ............ | G02B 6/3879 385/56 |
| 6,848,834 B1 * | 2/2005 | Roehrs | ................... | G02B 6/383 385/59 |
| 7,137,742 B2 * | 11/2006 | Theuerkorn | ......... | G02B 6/3831 385/53 |
| 7,207,727 B2 * | 4/2007 | Tran | ..................... | G02B 6/3825 385/54 |
| 7,780,173 B2 * | 8/2010 | Mullaney | ................. | H02G 3/22 277/621 |
| 9,291,790 B2 * | 3/2016 | Kimbrell | .............. | G02B 6/4471 |
| 9,304,262 B2 * | 4/2016 | Lu | ........................ | G02B 6/3885 |
| 9,513,451 B2 * | 12/2016 | Corbille | ............... | G02B 6/4471 |
| 9,678,283 B1 * | 6/2017 | Chang | .................. | G02B 6/3831 |
| 10,473,873 B2 * | 11/2019 | Diepstraten | .......... | G02B 6/4446 |
| 10,605,998 B2 * | 3/2020 | Rosson | .................. | G02B 6/387 |

(Continued)

*Primary Examiner* — Kaveh C Kianni
(74) *Attorney, Agent, or Firm* — Barley Snyder

(57) ABSTRACT

A connector assembly includes a connector and a fixing device. The connector has a housing, a ferrule mounted in the housing, and a rear body inserted into a rear end of the housing. The fixing device is connected to the rear body of the connector. The fixing device has a fixture formed in a single integrated piece. The fixture includes a connection part located at a front end of the fixture and configured to be connected to the rear body of the connector and a flexible protection part disposed adjacent to the connection part and configured to protect a cable passing therethrough.

17 Claims, 4 Drawing Sheets

(56) References Cited

U.S. PATENT DOCUMENTS

| | | | |
|---|---|---|---|
| 10,976,513 B2* | 4/2021 | Allen | G02B 6/4471 |
| 2004/0121646 A1* | 6/2004 | Iamartino | G02B 6/3887 |
| | | | 439/445 |
| 2005/0213892 A1* | 9/2005 | Barnes | G02B 6/3806 |
| | | | 385/62 |
| 2006/0115219 A1* | 6/2006 | Mudd | G02B 6/3887 |
| | | | 385/62 |
| 2007/0104445 A1* | 5/2007 | Larson | G02B 6/3846 |
| | | | 385/134 |
| 2008/0112672 A1* | 5/2008 | Lewallen | G02B 6/3825 |
| | | | 385/58 |
| 2008/0232743 A1* | 9/2008 | Gronvall | G02B 6/3897 |
| | | | 385/77 |
| 2010/0158452 A1* | 6/2010 | Takahashi | G02B 6/2558 |
| | | | 385/96 |
| 2010/0316344 A1* | 12/2010 | Bylander | G02B 6/3833 |
| | | | 385/134 |
| 2011/0002586 A1* | 1/2011 | Nhep | G02B 6/3887 |
| | | | 385/62 |
| 2011/0123157 A1* | 5/2011 | Belsan | H01R 13/516 |
| | | | 385/75 |
| 2011/0229098 A1* | 9/2011 | Abernathy | G02B 6/4433 |
| | | | 385/102 |
| 2012/0008909 A1* | 1/2012 | Mertesdorf | G02B 6/3897 |
| | | | 385/135 |
| 2012/0170896 A1* | 7/2012 | Skluzacek | G02B 6/389 |
| | | | 385/81 |
| 2012/0219254 A1* | 8/2012 | Bradley | G02B 6/3885 |
| | | | 385/78 |
| 2012/0257859 A1* | 10/2012 | Nhep | G02B 6/3888 |
| | | | 385/81 |
| 2013/0315541 A1* | 11/2013 | Nhep | G02B 6/3869 |
| | | | 385/80 |
| 2014/0205245 A1* | 7/2014 | Gallegos | G02B 6/3826 |
| | | | 385/81 |
| 2015/0071592 A1* | 3/2015 | Zimmel | G02B 6/3889 |
| | | | 385/80 |
| 2015/0117822 A1* | 4/2015 | Hu | G02B 6/3849 |
| | | | 385/86 |
| 2015/0241642 A1* | 8/2015 | Hikosaka | G02B 6/3826 |
| | | | 385/72 |
| 2015/0338581 A1* | 11/2015 | Hikosaka | G02B 6/3887 |
| | | | 385/83 |
| 2016/0018605 A1* | 1/2016 | Ott | G02B 6/3821 |
| | | | 385/78 |
| 2016/0018606 A1* | 1/2016 | Xue | H01R 31/06 |
| | | | 385/76 |
| 2016/0041356 A1* | 2/2016 | Wang | G02B 6/3821 |
| | | | 385/56 |
| 2016/0131857 A1* | 5/2016 | Pimentel | G02B 6/4471 |
| | | | 385/78 |
| 2016/0154184 A1* | 6/2016 | Bund | G02B 6/4452 |
| | | | 385/78 |
| 2016/0209599 A1* | 7/2016 | Van Baelen | G02B 6/387 |
| 2016/0252682 A1* | 9/2016 | Watte | G02B 6/3846 |
| | | | 385/65 |
| 2017/0212313 A1* | 7/2017 | Elenabaas | G02B 6/3869 |
| 2017/0336576 A1* | 11/2017 | Bund | G02B 6/3869 |
| 2018/0136427 A1* | 5/2018 | Theuerkorn | G02B 6/4477 |
| 2018/0292618 A1* | 10/2018 | Chang | G02B 6/3887 |
| 2018/0335577 A1* | 11/2018 | Wong | G02B 6/3825 |
| 2018/0341069 A1* | 11/2018 | Takano | G02B 6/3879 |
| 2019/0154930 A1* | 5/2019 | Ho | G02B 6/3887 |
| 2019/0179083 A1* | 6/2019 | Wang | G02B 6/3803 |
| 2019/0219775 A1* | 7/2019 | Iizumi | G02B 6/3893 |
| 2019/0310432 A1* | 10/2019 | Chang | G02B 6/3825 |
| 2019/0377139 A1* | 12/2019 | Chang | G02B 6/3898 |
| 2020/0064564 A1* | 2/2020 | Ho | G02B 6/3893 |
| 2020/0333537 A1* | 10/2020 | Gniadek | G02B 6/3825 |
| 2020/0341208 A1* | 10/2020 | Verheyden | G02B 6/3839 |
| 2021/0141167 A1* | 5/2021 | Wong | G02B 6/3893 |
| 2021/0173150 A1* | 6/2021 | Nhep | G02B 6/3861 |

\* cited by examiner

CONNECTOR ASSEMBLY

CROSS-REFERENCE TO RELATED APPLICATION

This application claims the benefit of the filing date under 35 U.S.C. § 119(a)-(d) of Chinese Patent Application No. 201910522567.8, filed on Jun. 17, 2019.

FIELD OF THE INVENTION

The present invention relates to a connector assembly and, more particularly, to a connector assembly including a connector and a fixing device.

BACKGROUND

An optical fiber connector assembly generally includes a plurality of LC type optical fiber connectors, a flexible protection member, and a fixing seat. The flexible protection member usually includes two flexible half bodies, which are adapted to be assembled together. The front end of each flexible half body is connected to a rear body of the optical fiber connector in a snap-fit manner, and a rear end of each flexible half body is connected to the fixing seat in a snap-fit manner. In this way, there are too many connection points on the flexible protection member, and these connection points easily crack during field installation and use.

SUMMARY

A connector assembly includes a connector and a fixing device. The connector has a housing, a ferrule mounted in the housing, and a rear body inserted into a rear end of the housing. The fixing device is connected to the rear body of the connector. The fixing device has a fixture formed in a single integrated piece. The fixture includes a connection part located at a front end of the fixture and configured to be connected to the rear body of the connector and a flexible protection part disposed adjacent to the connection part and configured to protect a cable passing therethrough.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
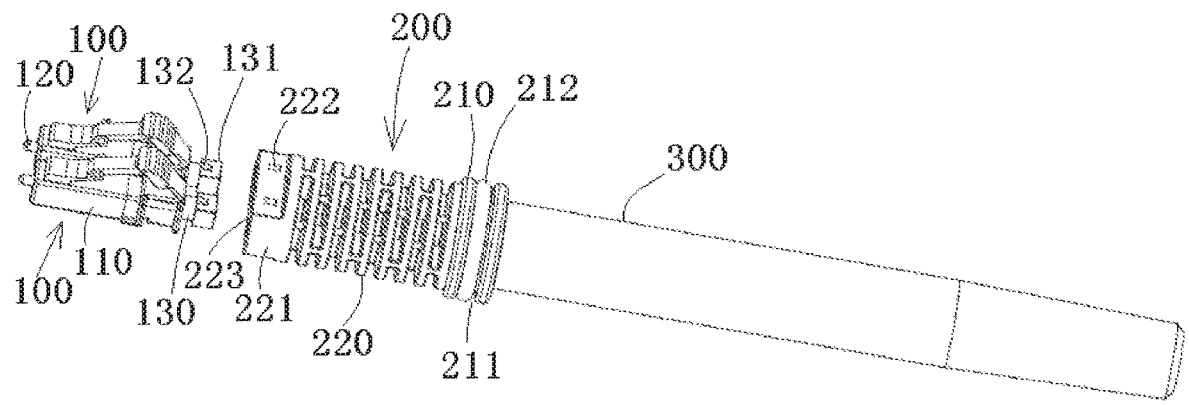
FIG. 1 is an exploded perspective view of a connector assembly according to an embodiment.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiment set forth herein; rather, these embodiments are provided so that the present disclosure will convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
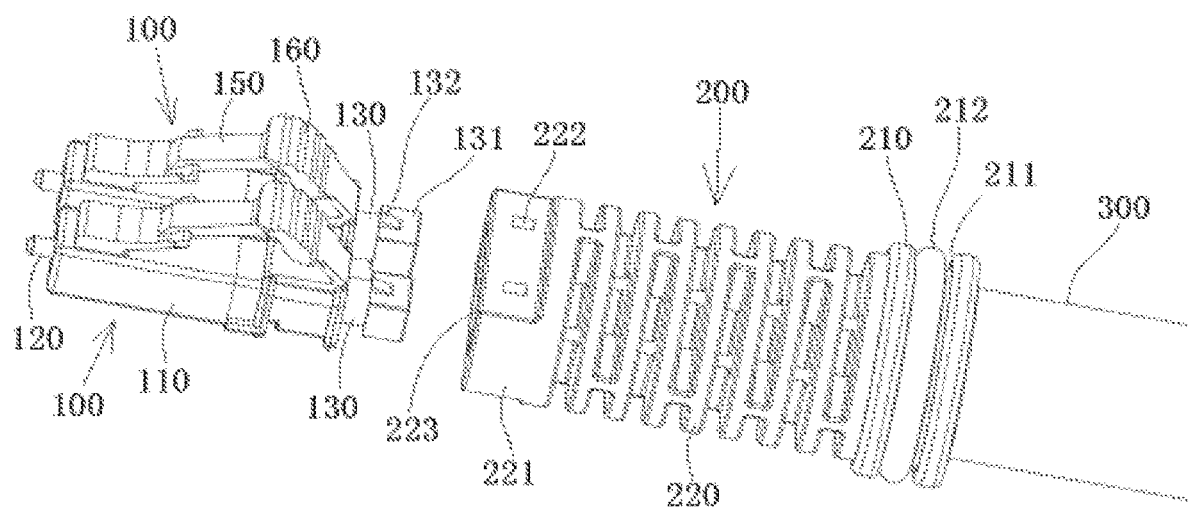
FIG. 2 is an enlarged view of a portion of the connector assembly shown in FIG. 1.

A connector assembly according to an embodiment, as shown in FIGS. 1 and 2, includes a connector 100 and a fixing device 200, 300. In the shown embodiment, the connector assembly includes two connectors 100, but the present disclosure is not limited to this, and the connector assembly may include one, three, four or more connectors 100.

Each connector 100, as shown in FIGS. 1-4, includes a housing 110, a ferrule 120 mounted in the housing 110, and a rear body 130 inserted into a rear end of the housing 110. In an embodiment, the connector 100 may be an optical fiber connector suitable for connecting with an optical fiber of an optical cable. The optical cable may comprise at least one optical fiber, and the at least one optical fiber of the optical cable may be connected to the at least one connector, respectively. In an embodiment, the connector 100 may be an LC or other type of optical fiber connector.

The fixing device 200, 300, as shown in FIGS. 1-4, is connected to the rear body 130 of each connector 100, and is configured to fix reinforcing elements of a cable (not shown, for example, an optical cable). In an embodiment, the reinforcing elements of the cable may be Kevlar fibers or other type of reinforcing elements.

The fixing device 200, 300, as shown in FIGS. 1-4, has a single integrated or one-piece fixture 200. The fixture 200 includes a connection part 221, a fixing seat 210, 230, and a flexible protection part 220. The connection part 221 is located at a front end of the fixture 200 and configured to be connected to the rear body 130 of each connector 100. The fixing seat 210, 230 is located at a rear end of the fixture 200 and configured to fix reinforcing elements of the cable. The flexible protection part 220 is disposed adjacent to the connection part 221 and configured to protect a cable passing through the flexible protection part 220.

As shown in FIGS. 1-4, in an embodiment, when an axial pulling force is applied to the optical cable, the axial pulling force will be transmitted to the housing 110 of the connector 100 via the fixture 200 and the rear body 130, so as to avoid the axial pulling force from being transmitted to the optical fiber of the optical cable. When a lateral pulling force directed in a radial direction is applied to the cable, the lateral pulling force causes the flexible protection part 220 to deform elastically, so as to prevent the cable from being over bent (if a bending radius of the cable is less than the allowable minimum bending radius, the fiber will be damaged).

In an embodiment, the fixture 200 may be a single molded piece molded from a thermoplastic material. The flexible protection part 220 may be formed with a hollow structure, so that the flexible protection part 220 has a predetermined flexibility. The connection part 221 is adapted to be connected to the rear body 130 of each connector 100 in a snap-fit manner.

Figure 6:
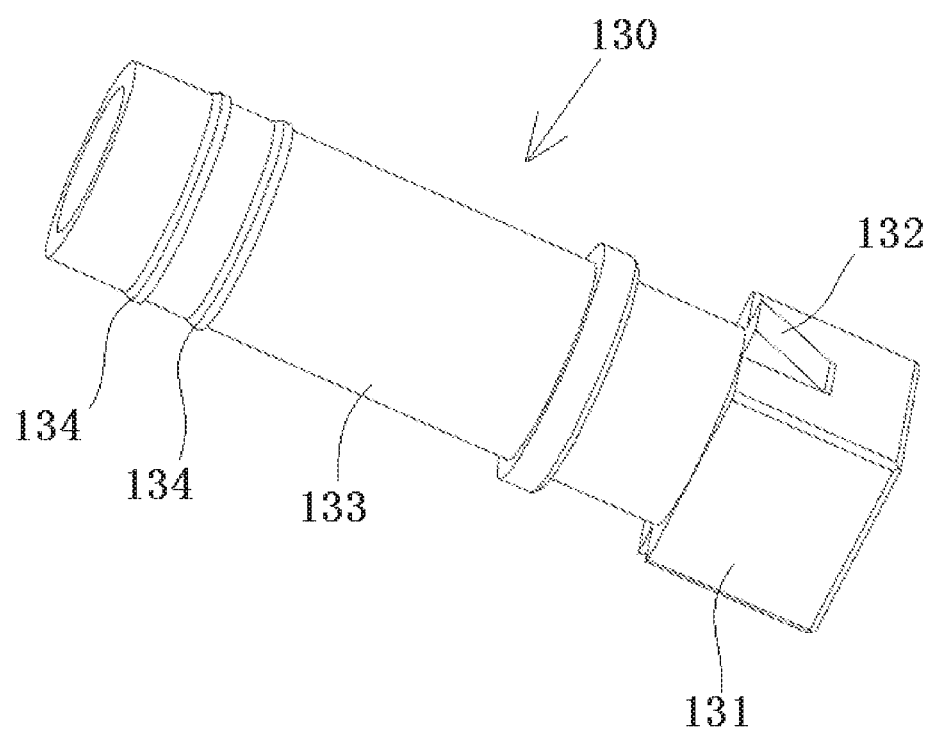
FIG. 6 is a perspective view of a rear body of a connector of the connector assembly of FIG. 1.

As shown in FIGS. 1 and 2, in an embodiment, an insertion chamber 223 is formed in the connection part 221, and a rear end part 131 of the rear body 130 is adapted to be inserted into the insertion chamber 223 of the connection part 221. Exemplarily, a slot 222 is formed in a side wall of the insertion chamber 223, and a protrusion 132 is formed on the rear end part 131 of the rear body 130. When the rear end part 131 of the rear body 130, shown in FIG. 6, is inserted into the insertion chamber 223 of the connection part 221, the protrusion 132 of the rear body 130 is latched into the slot 222. In an embodiment, the protrusion 132 on the rear body 130 is in the form of barb to prevent the protrusion 132 from separating from the slot 222.

As shown in FIGS. 1-3 and 5, the fixing seat 210, 230 includes a seat body part 210 and a tail pipe part 230. The seat body part 210 is connected to a rear end of the flexible protection part 220. The tail pipe part 230 is connected to a rear end of the seat body part 210. The reinforcing elements of the cable may be fixed on the tail pipe part 230.

As shown in FIGS. 1-3 and 5, the seat body part 210 is formed with a ring of groove 211, and an elastic sealing ring 212 is arranged in the groove 211. The connector assembly is adapted to be inserted into an optical fiber adapter (not shown). The elastic sealing ring 212 is used to realize the sealing between the connector assembly and the optical fiber adapter. The connector 100 of the connector assembly of the present disclosure is suitable for docking with a connector of another connector assembly (not shown) through the optical fiber adapter.

Figure 3:
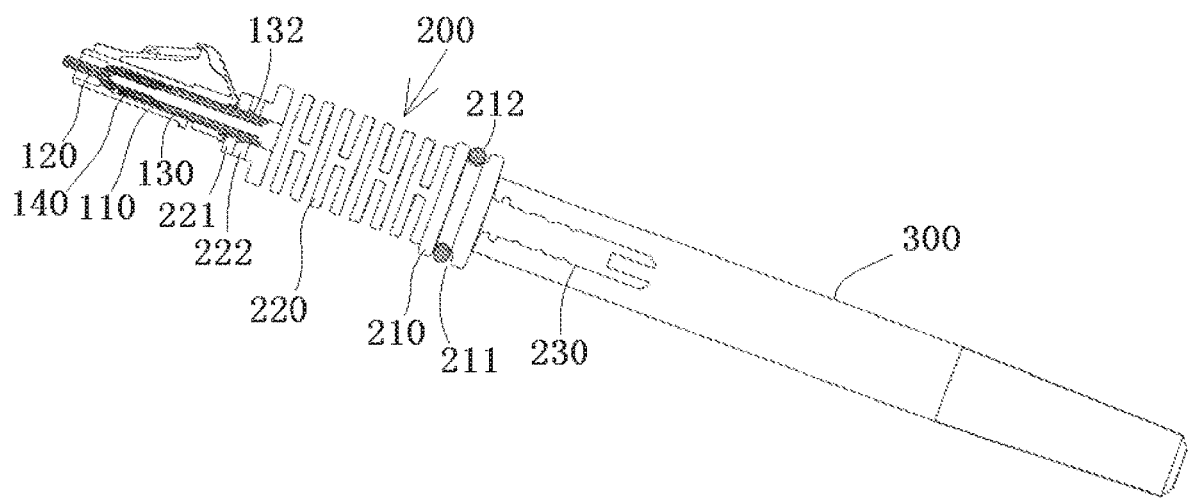
FIG. 3 is a sectional side view of the connector assembly of FIG. 1.
Figure 5:
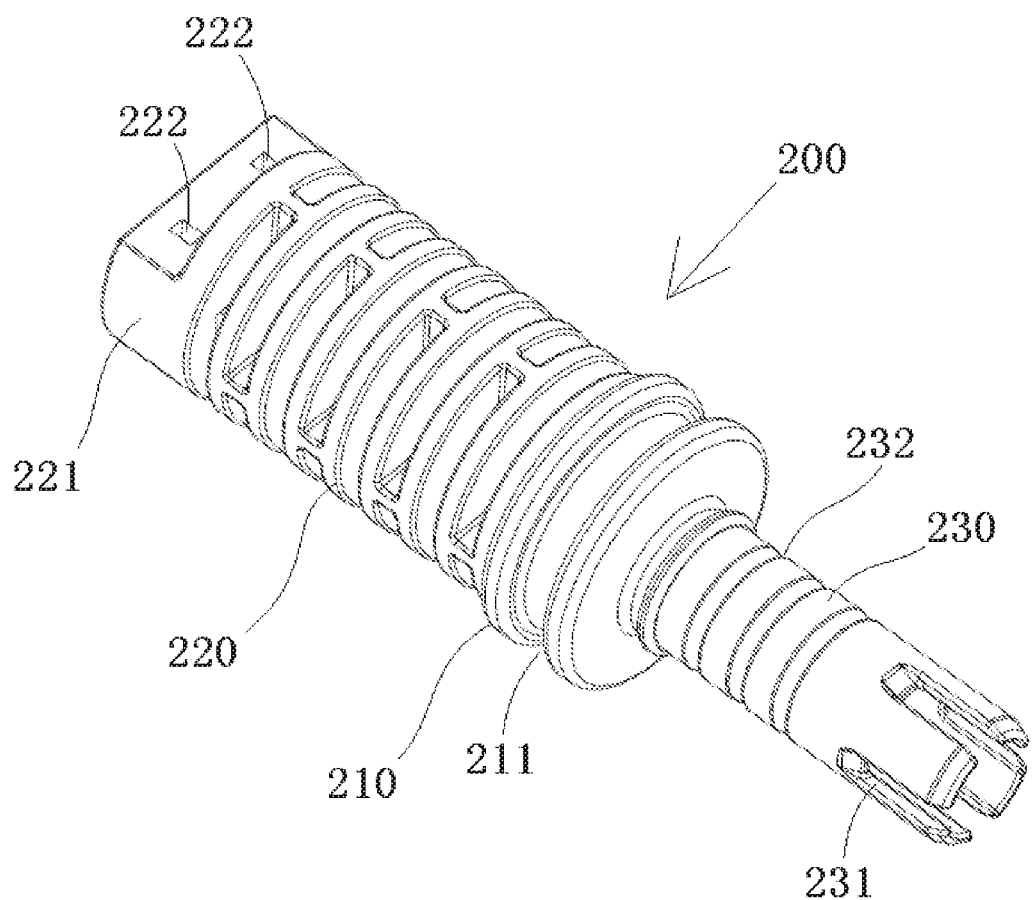
FIG. 5 is a perspective view of a fixing seat of the connector assembly of FIG. 1.

As shown in FIGS. 3 and 5, in an embodiment, a plurality of notches 231 are formed on the rear end of the tail pipe part 230, and the notches 231 are evenly distributed around the circumference of the tail pipe part 230. The reinforcing elements of the cable are divided into multiple strands. Each strand of reinforcing elements passes through the corresponding notch 231 of the tail pipe part 230 and is evenly laid on the outer wall of the tail pipe part 230.

The fixture 200, 300 further comprises a fixing sleeve 300, shown in FIGS. 1-3, which is wrapped on the tail pipe part 230 of the fixing seat 210, 230, so as to hold the reinforcing elements of the cable on the tail pipe part 230. In an embodiment, the fixing sleeve 300 is a molded piece molded over the tail pipe part 230 on which the reinforcing elements have been laid. As shown in FIG. 5, at least one circumferential groove 232 is formed on the tail pipe part 230 to enhance the jointing force between the fixing sleeve 300 and the tail pipe part 230.

The rear body 130, as shown in FIGS. 1-4 and 6, includes a tubular main body 133 adapted to be inserted into the housing 110. At least one circumferential convex ring 134 is formed on an outer wall of the tubular main body 133. At least one circumferential annular groove is formed in the inner wall of the housing 110. When the tubular main body 133 of the rear body 130 is inserted into the housing 110, the convex ring 134 is engaged with the annular groove to connect the rear body 130 to the housing 110.

Figure 4:
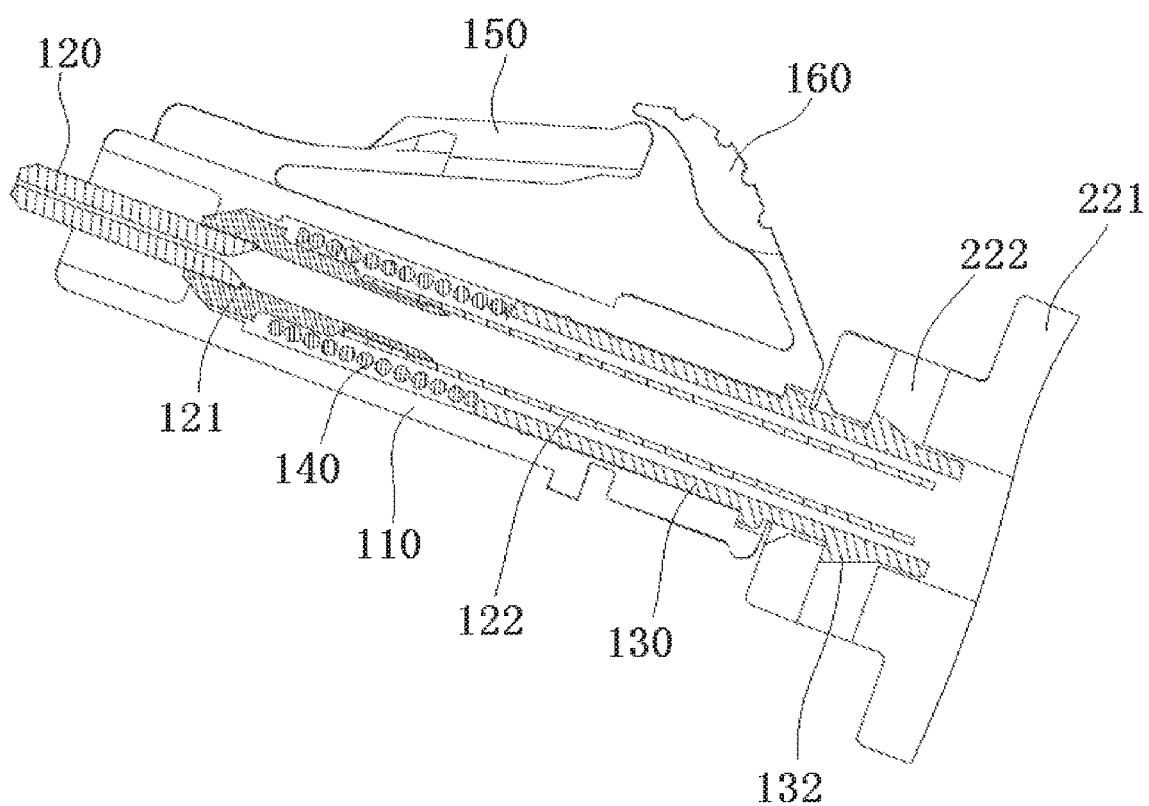
FIG. 4 is an enlarged view of a portion of the connector assembly shown in FIG. 3.

As shown in FIG. 4, in an embodiment, each connector 100 has a tail seat 121 and a spring 140 received in the housing 110. The tail seat 121 is connected to a rear end of the ferrule 120. The spring 140 is compressed between the tail seat 121 and the rear body 130 to apply an axial thrust to the ferrule 120.

As shown in FIG. 4, in an embodiment, each connector 100 further comprises a guide sleeve 122 received in the housing 110. The guide sleeve 122 is connected to the rear end of the tail seat 121. A central axis of the guide sleeve 122 is aligned with a central axis of the ferrule 120, so as to guide the optical fiber of the optical cable which passes through the guide sleeve 122 into an optical fiber jack of the ferrule 120.

As shown in FIGS. 2 and 4, an elastic latch 150 is provided on the housing 110 of each connector 100. The elastic latch 150 is adapted to be locked to an optical fiber adapter, so as to fix the connector 100 to the optical fiber adapter. An unlocking arm 160 is provided on the housing 110 of each connector 100. The elastic latch 150 can be separated from the optical fiber adapter by pressing the unlocking arm 160.

In various exemplary embodiments of the present disclosure, since the connection part 221 for connecting the rear body 130 of the connector 100 and the flexible protection part 220 for protecting the cable are made into a single integrated or one-piece fixture, there is no connection point between the connection part 221 and the flexible protection part 220. In this way, it may effectively avoid the cracking of the flexible protection part 220 in the process of installation and use.

It should be appreciated for those skilled in this art that the above embodiments are intended to be illustrative, and not restrictive. For example, many modifications may be made to the above embodiments by those skilled in this art, and various features described in different embodiments may be freely combined with each other without conflicting in configuration or principle. Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A connector assembly, comprising: a connector including a housing, a ferrule mounted in the housing, and a rear body inserted into a rear end of the housing; and a fixing device connected to the rear body of the connector, the fixing device has a fixture formed in a single integrated piece, the fixture includes a connection part located at a front end of the fixture and configured to be connected to the rear body of the connector and a flexible protection part disposed adjacent to the connection part and configured to protect a cable passing therethrough;
    wherein the fixture has a fixing seat located at a rear end of outer surface of the fixture and configured to fix a plurality of reinforcing elements of an optical cable.

2. The connector assembly according to claim 1, wherein the connection part is adapted to be connected to the rear body of the connector in a snap-fit manner.

3. The connector assembly according to claim 2, wherein an insertion chamber is formed in the connection part, and a rear end part of the rear body is adapted to be inserted into the insertion chamber of the connection part, a slot is formed in a side wall of the insertion chamber and a protrusion is formed on the rear end part of the rear body, the protrusion of the rear body is latched into the slot in response to the rear end part of the rear body being inserted into the insertion chamber of the connection part.

4. The connector assembly according to claim 3, wherein the protrusion on the rear body is a barb preventing the protrusion from separating from the slot.

5. The connector assembly according to claim 1, wherein the fixing seat has a seat body part and a tail pipe part, the seat body part is connected to a rear end of the flexible protection part, the tail pipe part is connected to a rear end of the seat body part, and the reinforcing elements are fixed on the tail pipe part.

6. The connector assembly according to claim 5, wherein a ring of groove is formed on the seat body part and an elastic sealing ring is arranged in the groove, the connector assembly is adapted to be inserted into an optical fiber adapter and the elastic sealing ring seals between the connector assembly and the optical fiber adapter.

7. The connector assembly according to claim 5, wherein a plurality of notches are formed on the rear end of the tail pipe part, the notches are evenly distributed around a circumference of the tail pipe part, the reinforcing elements of the optical cable are divided into multiple strands, each strand of reinforcing elements passes through one of the notches of the tail pipe part and is evenly laid on an outer wall of the tail pipe part, the fixture has a fixing sleeve wrapped on the tail pipe part to hold the reinforcing elements on the tail pipe part.

8. The connector assembly according to claim 7, wherein the fixing sleeve is a molded piece molded on the tail pipe part on which the reinforcing elements have been laid.

9. The connector assembly according to claim 8, wherein a circumferential groove is formed on the tail pipe part to enhance a jointing force between the fixing sleeve and the tail pipe part.

10. The connector assembly according to claim 1, wherein the connector includes a tail seat and a spring received in the housing, the tail seat is connected to a rear end of the ferrule, and the spring is compressed between the tail seat and the rear body to apply an axial thrust to the ferrule.

11. The connector assembly according to claim 10, wherein the connector includes a guide sleeve received in the housing, the guide sleeve is connected to a rear end of the tail seat, a central axis of the guide sleeve is aligned with a central axis of the ferrule to guide the optical fiber of the optical cable which passes through the guide sleeve into an optical fiber jack of the ferrule.

12. The connector assembly according to claim 2, wherein an elastic latch is provided on the housing, the elastic latch is adapted to be locked to an optical fiber adapter to fix the connector to the optical fiber adapter.

13. The connector assembly according to claim 12, wherein an unlocking arm is provided on the housing, the elastic latch is separated from the optical fiber adapter by pressing the unlocking arm.

14. The connector assembly according to claim 1, wherein the connector is an LC type optical fiber connector.

15. The connector assembly according to claim 1, wherein the connector includes a guide sleeve received in the housing, with the rear body inserted into the rear end of the housing, the guide sleeve having a first end extending from a front of the rear body in a direction toward the ferrule and a second end extending into a rear end part of the rear body, the rear end part being inserted into the connection part of the fixture.

16. The connector assembly according to claim 15, wherein the connector includes a tail seat connected to a rear end of the ferrule, the first end of the guide sleeve connected to a rear end of the tail seat.

17. A connector assembly, comprising:
a connector including a housing, a ferrule mounted in the housing, and a rear body inserted into a rear end of the housing, the rear body includes a tubular main body adapted to be inserted into the housing, a circumferential convex ring is formed on an outer wall of the tubular main body, and a circumferential annular groove is formed on an inner wall of the housing, the circumferential convex ring is engaged with the circumferential annular groove to connect the rear body to the housing when the tubular main body of the rear body is inserted into the housing; and
a fixing device connected to the rear body of the connector, the fixing device has a fixture formed in a single integrated piece, the fixture includes a connection part located at a front end of the fixture and configured to be connected to the rear body of the connector and a flexible protection part disposed adjacent to the connection part and configured to protect a cable passing therethrough.

\* \* \* \* \*